(12) United States Patent
Ling

(10) Patent No.: US 7,506,359 B1
(45) Date of Patent: Mar. 17, 2009

(54) METHOD FOR PREVENTING PARASITIC USAGE OF WEB PAGE EMBEDDED FILES

(75) Inventor: Christopher John Ling, Romsey (GB)

(73) Assignee: International Business Machines Corporation, Armonk, NY (US)

( * ) Notice: Subject to any disclaimer, the term of this patent is extended or adjusted under 35 U.S.C. 154(b) by 624 days.

(21) Appl. No.: 09/667,366

(22) Filed: Sep. 22, 2000

(30) Foreign Application Priority Data

Dec. 23, 1999 (GB) .................................. 9930281.2

(51) Int. Cl.
  *G06F 7/04* (2006.01)
  *G06F 17/30* (2006.01)
  *H04L 9/32* (2006.01)
(52) U.S. Cl. ................................. 726/2; 726/26; 726/27
(58) Field of Classification Search .................. 705/14; 709/227, 232, 203; 713/290, 153; 726/2, 726/4, 5
See application file for complete search history.

(56) References Cited

U.S. PATENT DOCUMENTS

| | | | | |
|---|---|---|---|---|
| 5,761,673 A | | 6/1998 | Bookman et al. ........... 707/104 |
| 5,875,296 A | * | 2/1999 | Shi et al. .................... 713/202 |
| 6,298,446 B1 | * | 10/2001 | Schreiber et al. ............ 713/201 |
| 6,311,269 B2 | * | 10/2001 | Luckenbaugh et al. ...... 713/154 |
| 6,353,929 B1 | * | 3/2002 | Houston ...................... 725/20 |
| 6,922,781 B1 | * | 7/2005 | Shuster ........................ 713/165 |

FOREIGN PATENT DOCUMENTS

| | | |
|---|---|---|
| WO | 9825373 | 6/1998 |
| WO | 9832066 | 7/1998 |
| WO | 9955040 | 10/1999 |
| WO | 0070428 A2 | 11/2000 |

OTHER PUBLICATIONS

Scott Clark, http://www.webdeveloper.com/html/htm_metatags_part2.html, Nov. 98.*

* cited by examiner

*Primary Examiner*—Benjamin E Lanier
(74) *Attorney, Agent, or Firm*—A. Bruce Clay; Hoffman Warnick LLC

(57) ABSTRACT

A request is received from a client for a web page hosted by a web server. Responsive to this request, a persistent client state object having an identifier therein is returned to the client. When a request is received from a client for elements of the web page hosted by the web server, the client is first required to return the persistent client state object having the identifier therein before the requested web page element is sent to the client.

19 Claims, 3 Drawing Sheets

METHOD FOR PREVENTING PARASITIC USAGE OF WEB PAGE EMBEDDED FILES

FIELD OF THE INVENTION

The present invention relates generally to controlling usage of files stored at one Web site (server) and referred to by web pages stored at another Web site.

BACKGROUND OF THE INVENTION

The World Wide Web of the Internet is the most successful distributed application in the history of computing. In the Web environment, client machines effect transactions to Web servers using the Hypertext Transfer Protocol (HTTP), which is a known application protocol providing users access to files (e.g., text, graphics, images, sound, video, etc.). A standard page description language known as HyperText Markup Language (HTML) provides basic document formatting and allows the developer to specify "links" to other web servers and files and also to specify pointers to other files located on a Web server which are to be downloaded by the client and displayed as embedded elements of the web page. Examples of such embedded elements include files containing images for display, and in particular files containing the images for display as "action buttons". In the Internet paradigm, a network path to a file or web server is identified by a so-called Uniform Resource Locator (URL) having a special syntax for defining a network connection. Use of an HTML-compatible browser (for example, Netscape Navigator) at a client machine involves specification by a user of a link via the URL (Netscape Navigator is a trademark of Netscape Communications Corporation). In response, the client makes a request to the web server identified in the link and receives in return a document formatted according to HTML.

There are more and more frequent examples of Internet web pages that have the look and feel of a first company, such as International Business Machines Corporation (IBM), including use of that company's banner headings and left hand side titles, but which do not in fact originate from that first company. The main content of the web page originates from a second, unrelated company trying to pass itself off as the first company. For example, there are a number of web pages that have the look and feel of the IBM web pages, including the use of the IBM logo and IBM banner heading. These web pages have a structure that has an Action URL that points to a web page belonging to and controlled by the second company, but the Action URL itself contains tags such as SRC tags that point to elements of web pages belonging to the first company. For example, a web page that has no association with IBM includes SRC tags that point to two image files http://www.ibm.com/klingon/logo_sp.gif and to http://www.ibm.com/klingon/i_support.gif, which are both located on Web servers belonging to IBM. That web page, when rendered in a browser, then includes the IBM logo and a "Support" action button identical to that on IBM pages, even to the extent of being updated if the IBM one changes. By the use of SRC tags, the second company is including material from the first company's Web site by reference without actually having that material included in the source text of the second company's web page.

While on the one hand it can be argued that this constitutes a form of copyright infringement, it can be seen that this practice presents a more worrying possibility for fraud, as it is entirely possible for actions associated with the images to operate in a manner completely contrary to the business objectives of the image owner.

So it would be desirable to provide a method of checking that an element of a web page is being downloaded for use in web pages originating from the same web server as the web server where the element is being stored.

DISCLOSURE OF THE INVENTION

Accordingly, the present invention provides a method of verifying a right to use an element of a web page hosted by a web server, the method comprising the steps of: responsive to a request from a client for a web page hosted by a web server, storing an indicator that said client has requested a web page hosted by said web server; responsive to a request from a client for an element of a web page, checking for said indicator that said client has requested a web page from said web server; and responding to the request from the client for said element of a web page hosted by the web server according to the result of said checking step.

The present invention provides the advantage that prior to an element of a web page being downloaded to a client, it is verified that the element is being downloaded for the purpose of inclusion in a web page originating from the same source as the element itself. This means that "counterfeit" pages which refer to these elements will not be able to download these elements correctly.

In a first embodiment, if the client does not return a persistent client state object having the identifier therein, a message for display at the client is returned to the client. The message may warn the client that the web page being displayed may not originate from the source which the client may be led to believe it originates from or may simply comprise a conventional client error code 4xx message as defined in the HTTP protocol.

Alternatively, if the client does not return the persistent client state object having the identifier therein, a substitute element is returned to the client. This may warn the client as above, or it may provide a logo or contact information in order to report the counterfeit page.

In a further alternative, if the client does not return the persistent client state object having the identifier therein, no response is sent to the client. The client software then takes whatever action it would normally take where it is unable to establish contact with the requested web server.

Preferably, the persistent client state object is a cookie. Cookies are supported by all major browsers and the operation of the invention is then transparent to the user at the client end.

In a preferred embodiment, the persistent client state object expires after a pre-determined period of time. This means that elements of the web page may only be downloaded for a period of time after the web page itself has been downloaded.

The present invention further provides a programmable storage device, an article of manufacture and a computer program comprising computer program code means adapted to perform all the steps of the method described above when said method is performed on a computer.

BRIEF DESCRIPTION OF THE DRAWINGS

Embodiments of the invention will now be described, by way of example, with reference to the accompanying drawings, in which.

DETAILED DESCRIPTION OF THE INVENTION

Figure 1:
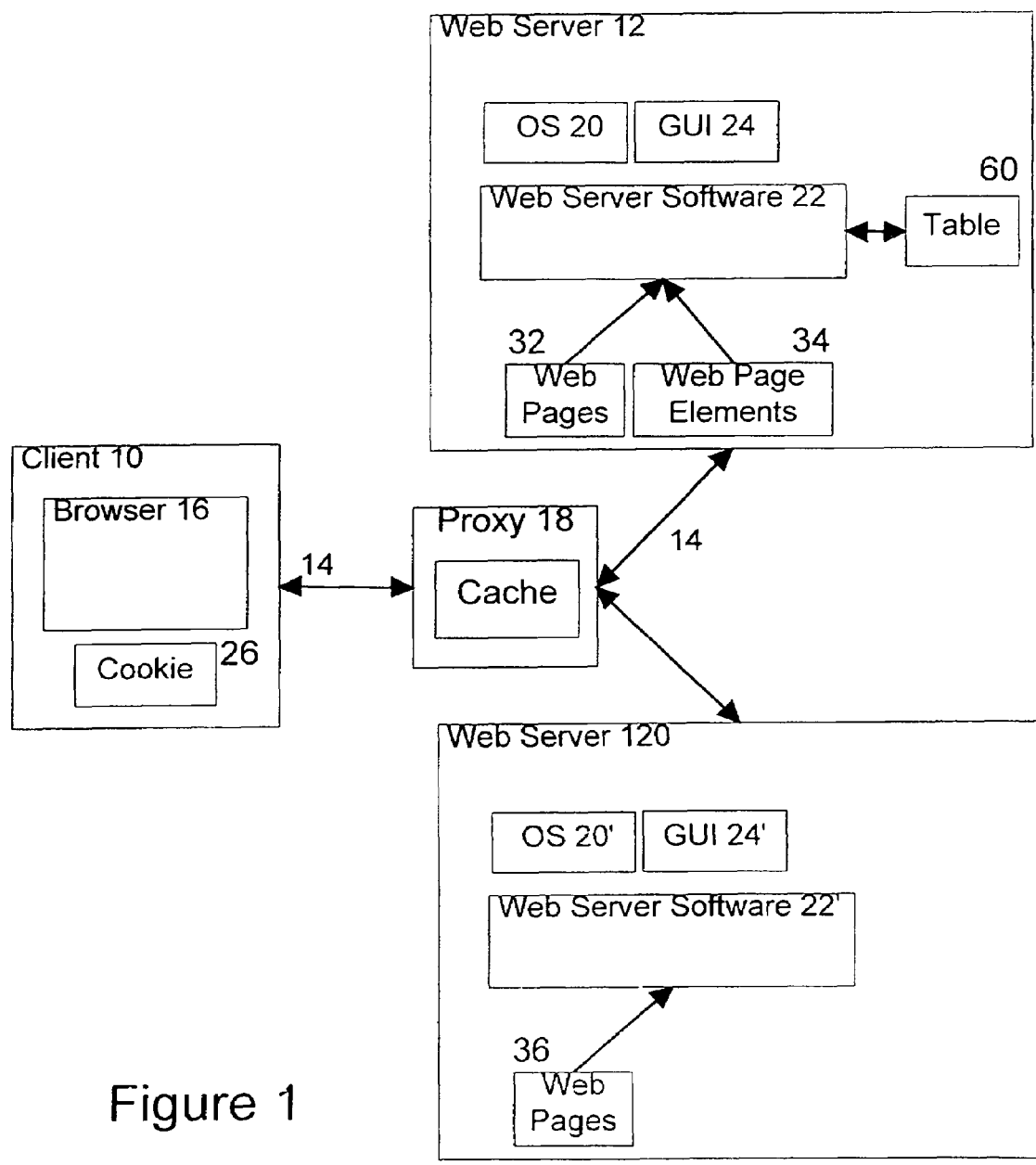
FIG. 1 is a representative system in which embodiments of the present invention may be implemented.

A representative system in which the present invention is implemented is illustrated in FIG. 1. A client machine 10 is connected to a web server 12 or 120 via a communication channel 14. In the present specification the terms "web server", "web site" and "domain" are used interchangeably. It is acknowledged, however, that more than one server type computer may be involved in supporting a single web site or domain and so the invention should not be limited to the case of a web server based on a single computer.

The client/web server connection may either be direct or may be via one or more proxy servers 18, although in the first embodiment, the proxy 18 simply relays requests and responses along the channel 14 in a conventional manner. For illustrative purposes, channel 14 is the Internet, an Intranet or other known connection. In the case of the Internet, Web servers 12, 120 are only two of a plurality of web servers which are accessible by clients, one of which is illustrated by machine 10. A client machine includes a browser 16, which is a known software tool used to access the web servers of the network. By way of example only, a client machine is a personal computer. Representative browsers include, among others, Netscape Navigator (all versions), Microsoft Internet Explorer (all versions) or the like, each of which are "off-the-shelf" or down loadable software programs (Internet Explorer is a trademark of Microsoft Corporation).

A representative Web Server 12 comprises an IBM RISC System/6000 (a reduced instruction set or so-called RISC-based workstation) running the AIX (Advanced Interactive Executive Version 4.1 and above) Operating System 20 and a Web server program 22, such as Netscape Enterprise Version 2.0, that supports interface extensions. The web server 12 also includes a graphical user interface (GUI) 24 for management and administration (AIX is a trademark of IBM Corporation and Netscape is a trademark of Netscape Communications Corporation). While the above web server platform is useful, any other suitable hardware/operating system/Web server combinations may be used and, for example, a different operating system 20', web server program 22' and GUI 24' may be employed on web server 120.

In the present example, the web server 12 stores files in the form of HyperText documents (web pages) 32 and objects including web page elements 34. An unauthorised Web site 120 belonging to a second company, with a URL of, for example, www.counterfeit.co.uk may have one or more web pages 36 including HTML code, which it displays intending that page to look like the web page of the company owning the web server 12, such as IBM Corporation. The domain name www.counterfeit.co.uk is entirely fictional and is not intended to refer to any actual domain, past, present or future. The portion of code below represents a single row of a table, other rows present have been omitted for clarity:

<TABLE CELLSPACING=0 CELLPADDING=0 BORDER=0 WIDTH="100%">

<TR>

...

<TD WIDTH=451 BGCOLOR="#0033CC" ALIGN=LEFT VALIGN=TOP><AHREF="http://www.ibm.com/"><IMG SRC="http://www.ibm.com./klingon/ibm_logo_m.gif" WIDTH=97 HEIGHT=45 ALT="IBM"

HSPACE=0 VSPACE=0 BORDER=0></A><IMG SRC="http://www.ibm.com/klingon/logo_sp.gif"

WIDTH=337 HEIGHT=41 ALT="IBM" BORDER=0></TD>

...

</TR>

</TABLE>

In the above example, the HTML OBJECT tag may be used in place of the SRC tag for embedding an image file. There are corresponding syntax changes, as are known to those skilled in the art.

When the Web server 12 (in the above example, http://www.ibm.com) that contains the elements 34 pointed to by the SRC tags (in the above example, http://www.ibm.com/klingon/ibm_logo_m.gif and http://www.ibm.com/klingon/logo_sp.gif) receives a request for one of those elements, the Web server 12 checks whether the request for that element to be downloaded came from a web page having a URL that was associated with an authorised page, that is, in the example above, from a URL located in the ibm.com domain. If the web page element is being requested from a URL that is not located in the ibm.com domain, then either a message for display can be returned in place of the URL or an alternative URL can be provided to the requesting site. Such a URL may indicate that the web page being displayed may not originate from whom it would appear to originate.

A first embodiment of the invention uses Persistent Client State HTTP Cookies. Cookies are a known Internet mechanism which server-side connections (such as CGI scripts) can use to both store and retrieve information on the client side of the connection. The Cookies Preliminary Specification may be viewed at http://www.home.netscape.com/newref/std/cookie_spec_html. A web server, when returning an HTTP object to a client, may also send a piece of state information which the client will store. Typically, the state object, called a cookie 26, may include a description of the range of URLs for which that state is valid. Many internet web pages already set a cookie on the client when they are first accessed. These cookies typically store information identifying where the user is located and the language of the user.

Figure 2:
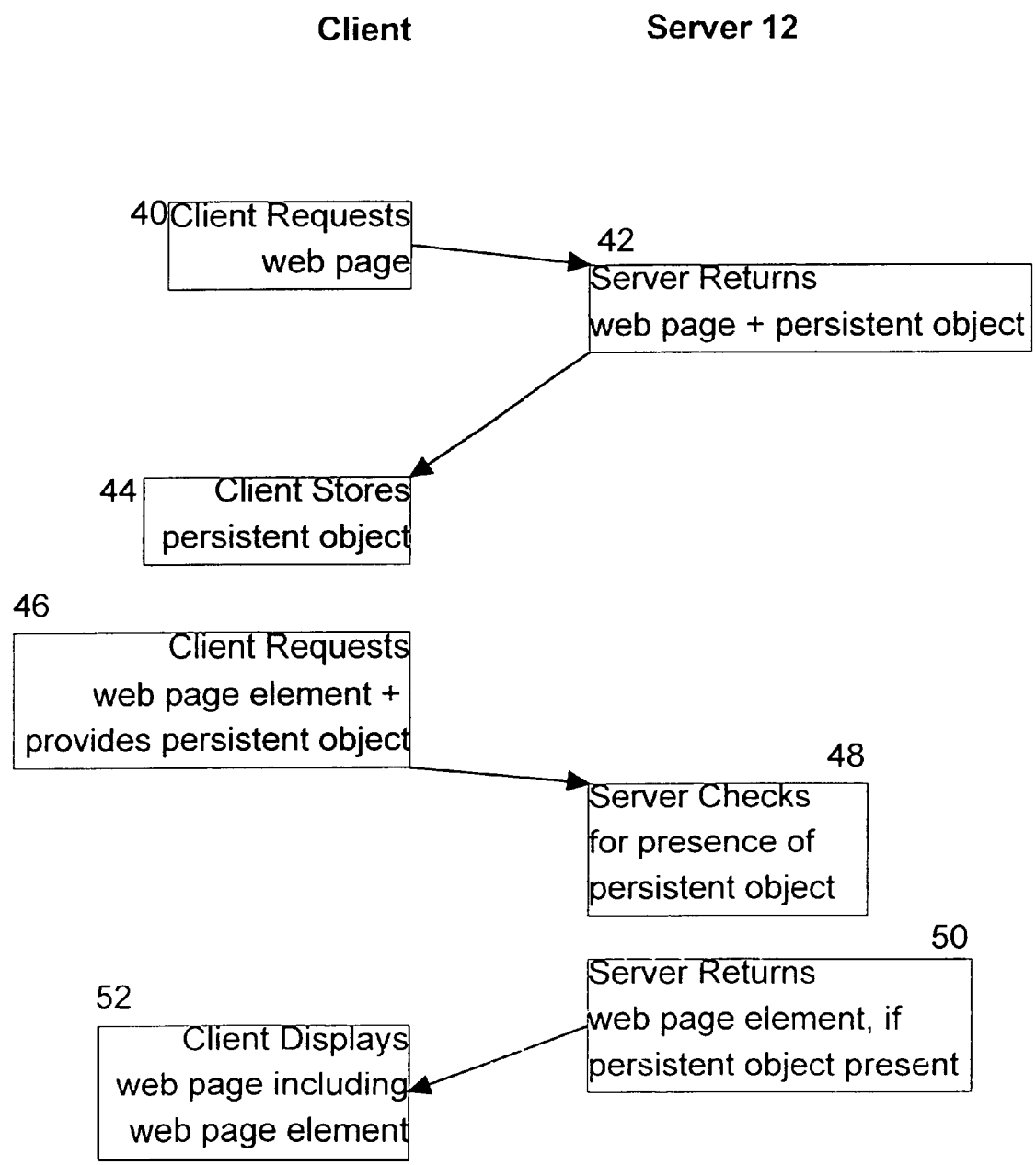
FIG. 2 illustrates the process of an embodiment of the present invention in which the web page element requested by the client originates from the same domain as the requesting web page.

Referring now to FIG. 2, which illustrates the steps which take place when a web page element requested by a client originates from the same domain as the requested web page. When a web page 32 belonging to the first company is requested by a client 10, step 40, that web site sends a cookie 26 to the client with stored data, step 42. This may be done by providing a response such as:

Set-Cookie: STATUS=ACCESSED; domain=ibm.com; path=/klingon

The client stores the cookie 26, step 44, so that when the client subsequently requests an element stored in the /klingon path on the ibm.com domain on this web server, step 46, the client will send:

Cookie: STATUS=ACCESSED

In the above example, STATUS is a name that is used and ACCESSED is the value of that name, indicating that the client has accessed a web page 32 located on the web server 12 of the first company and that therefore the request for an element 34 stored in the /klingon path is for that web page 32. Optionally, the cookie 26 may have an expiration time or date, such that accesses after the expiration time or date do not send the cookie data from the client to the web server. An expiration date may be achieved by the addition of an expires=DATE attribute, the date string being formatted as Wdy, DD-Mon-YYYY HH:MM:SS GMT. In this manner, the Cookie that is sent may be frequently changed, so that a counterfeiting web page 36 may not imitate the cookie successfully by taking a copy of the cookie.

The web server 12 containing the web page 32 belonging to the first company checks the cookie, step 48, has been received from the client before allowing the element 34 stored in the /klingon path to be downloaded, step 50, after which it is displayed by the client, step 52.

Figure 3:
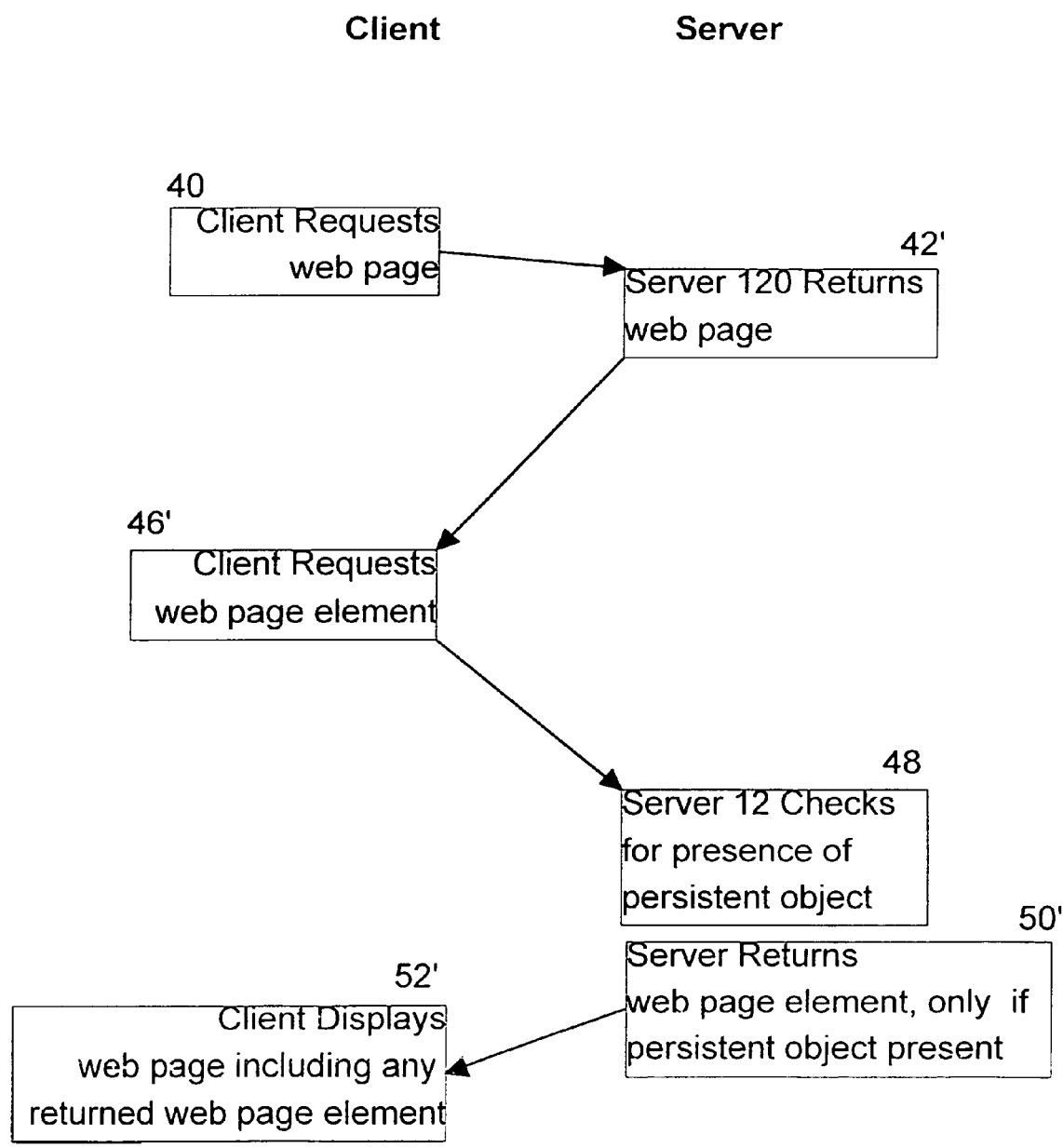
FIG. 3 illustrates the process of an embodiment of the present invention in which the web page element requested by the client originates from a different domain than the requesting web page.

FIG. 3 on the other hand illustrates the steps which take place when a web page element requested by a client originates from a different domain than the requesting web page. Step 40 is as before except that in reply the web server 120, i.e., the server does not have the web page element on it, will not return a cookie, step 42' and so the client will not store a cookie. Thus, when requesting a web page element 34, step 46', the client will not provide the cookie to the web server 12. Step 48 is as before, except that because the cookie has not been sent, the web server either refuses to send the requested element or sends a substitute element perhaps alerting the client to the fact that the web page which is requesting the element may not be a genuine page, step 50'. The client browser displays the element or error message regardless, step 52', and so the user will see that they have accessed a counterfeit page. As an alternative, the web server 12 can just not respond to the request or the web server can respond with a conventional client error code 4xx message as defined in the HTTP protocol.

In a second embodiment of the present invention, it is the web server 12 that keeps track of a client's request for web pages 32 on the web server storing the web pages elements 34, rather than the client retaining a Cookie.

In this case, the web server software 22 stores the TCP/IP address of each client accessing a web page on the web server 12 as an entry in a table 60. Preferably, an entry date or expiration date is associated with each TCP/IP entry in the table 60, so that a clean-up thread or process can asynchronously run over the table and delete entries where the last client access to the web server 12 took place more than a pre-determined time beforehand. When the software 22 receives subsequent requests for web page elements 34, the software 22 checks the table 60 to determine if the request for a web page element is coming from a client TCP/IP address in the table. If so, the web page element is returned to the client and if not, the web server 12 can again either refuse to send the element and return a status code, send a substitute element or simply not respond.

In the first and second embodiments, it can be seen that implementation of the invention falls on the web server 12 or content owner who is concerned about misappropriation or fraudulent use of their material. Nonetheless, it will be seen that when other problems have become more widely recognised, then extensions to both HTTP and HTML have been defined enabling a web wide solution to such problems.

In further embodiments of the invention, an extension to the HTML or HTTP Specifications may be used for performance, either by a web client or a proxy, of the function of verifying that the web page element 34 that is requested from a web server 12 is being requested from a web page 32 associated with the web server.

In a third embodiment, a conventional browser needs to be adapted to implement or assist in implementing the invention. In the first variation of this embodiment, the adapted browser 16 parses a web page for display as normal. On encountering a reference to a web page element, the browser alone decides whether or not to make the request for the web page element based on whether or not the element resides on the same web server as the web page. If a web page element is from the same web server as the web page, a HTTP Get request is made and the returned element displayed. If not, then the browser either leaves the element display blank, as if the web server had not responded to a web page element request, or the browser displays a message or image warning the user that the web page may be from a counterfeit web server.

This of course is quite a crude mechanism as, unlike when the decision is made by the web server 12, the browser has little idea whether or not references to web page elements by web pages from other web servers are authorised or not.

As such, a refinement of this embodiment requires that conventional browsers be adapted to include in HTTP Get requests for web page elements, information derived from the web pages referencing those web page elements.

One example of such a refinement, requires that the browser includes the URL of the web page referencing the web page element in the HTTP Get request for the web page element. On receipt of the request for the web page element, the web server 12 can decide whether or not the request is coming from a bone fide source. If so, the web page element is returned and, if not, the request is denied as before.

Alternatively, web pages 32 from a web server 12 containing web page elements 34; or web pages (not shown) from web servers previously authorised to reference such web page elements include meta-tags which are detected by a browser parsing such pages. The meta-tags are then included, instead of or along with the web server URL, in any HTTP Get request to the web server 12 containing the web page elements. (The meta-tags can be encoded in any conventional manner to prevent duplication by a counterfeit site.) If the web server 12 detects an authentic meta-tag and/or URL from an authorised web server, the web page element is returned and, if not, the request is denied as before.

These embodiments are advantageous in that: no data need be stored on the client machine; they are more flexible than the first and second embodiments, which are difficult to extend to allow web pages on other authorised web servers to access web page elements on the web server 12; and web servers which are not concerned with 3rd parties referencing their web page elements are not affected by the operation of other more concerned content owners. However, these embodiments have the disadvantage that they use an extension to the basic HTML language and/or HTTP protocol and as such are likely to be less portable to different client platforms.

A fourth embodiment of the invention is based on the techniques disclosed in PCT Application No. PCT/GB98/02920 corresponding to U.S. application Ser. No. 08/939,277 relating dynamic pre-fetching of information or objects for clients. This document concerns a technique used by proxy servers, of the type represented by the server 18, for identifying web pages according to PICS (Platform for Internet Content Selection) meta-tags included in web pages and then deciding whether or not to pre-fetch into a cache data referred to in the web page.

In this embodiment, such a proxy server 18 can be adapted to determine from the presence or absence of suitable meta-tags in a web page being relayed to a client 10, not alone whether or not to pre-fetch the web page elements referred to in such a web page, but also whether or not in subsequent client requests for those web page elements to return the web page elements to the client.

What the above invention does not solve is where the web page element in question is simply copied by cut and paste from the first company's web page, saved locally, and then reloaded from the local source whenever a request for that element is received. However, if this approach is used, then there is a clear copyright infringement by the second company as they have copied the element and saved it locally. When they merely include a reference to the web page element, they may not have infringed copyright as a primary infringer, as the end user of the web page is the person who infringes copyright by downloading the element from the first company's web page. Use of the present invention prevents the second company from merely including a reference to a web page element of the first company's web page and avoiding primary copyright infringement in this manner.

What is claimed is:

1. A method of verifying a right to use an element of a web page hosted by a web server, the method comprising the steps of:

every time a request is made from a client for a web page hosted by a web server, storing an indicator that said client has requested the web page hosted by said web server;

responsive to a request from a client for an element of said web page that is stored in a separate file from the web page and displayed as an embedded element of said web page, checking for said indicator that said client has requested said web page from said web server; and responding to the request from the client for said element of said web page hosted by the web server according to the result of said checking step, wherein the element of said web page is eliminated from use by another web site than that of the web server.

2. The method as claimed in claim 1, wherein said storing step comprises:

returning to the client a persistent client state object having an identifier therein; and wherein said checking step comprises checking for said persistent client state object having the identifier therein returned by said client, prior to said responding step.

3. The method as claimed in claim 2 wherein the persistent client state object is a cookie.

4. The method as claimed in claim 2 wherein the persistent client state object expires after a pre-determined period of time.

5. The method as claimed in claim 1 wherein said storing step comprises adding an identity of said client to a table associated with said web server; and wherein said checking step comprises checking for said client identity in said table, prior to said responding step.

6. The method as claimed in claim 1 wherein said table includes an expiration time associated with a respective client identity in said table.

7. A method of verifying a right to use an element of a web page hosted by a web server, the method comprising the steps of:

responsive to a request from a client for an element of a web page that is stored in a separate file from the web page and displayed as an embedded element of said web page, checking said request for an indicator that said request results from a client request for a web page hosted by an authorised web server, the indicator having been provided to the client by the authorised web server every time a request was made from the client for the web page hosted by the authorised web server; and responsive to the presence of such an indicator, responding to the request from the client with said element of a web page, wherein the element of said web page is eliminated from use by another web site than that of the web server.

8. The method as claimed in claim 7 wherein said indicator comprises a Uniform Resource Locator (URL) for said web page, and said checking step comprises checking that said web page URL is from an authorised web server.

9. The method as claimed in claim 7 wherein said indicator comprises a meta-tag incorporated in web pages from authorised servers, and said checking step comprises checking that said meta-tag is from an authorised web server.

10. The method as claimed in claim 9 wherein said meta-tag is a PICS compliant tag.

11. The method as claimed in claim 7 operable in one of: said web server or a proxy server connecting said web client to said web server.

12. The method as claimed in claim 7 wherein if said checking step fails to detect said indicator, said responding step comprises returning a message for display at the client to the client.

13. The method as claimed in claim 7 wherein if said checking step fails to detect said indicator, said responding step comprises returning a substitute element to the client.

14. The method as claimed in claim 7 wherein if said checking step fails to detect said indicator, said responding step comprises returning no response to the client.

15. A computer program product for verifying a right to use an element of a web page, the computer program product comprising:

a computer-readable storage medium having a substrate; and program data encoded in the substrate of the computer-readable storage medium, wherein the program data comprises means for performing the steps of claim 1, or claim 7.

16. A computer device having a computer program comprising computer program code means adapted to perform all the steps of claim 1 when said program is run on the computer device.

17. The method as claimed in claim 1, wherein if said checking step fails to detect said indicator, said responding step comprises returning a message for display at the client to the client.

18. The method as claimed in claim 1, wherein if said checking step fails to detect said indicator, said responding step comprises returning a substitute element to the client.

19. The method as claimed in claim 1, wherein if said checking step fails to detect said indicator, said responding step comprises returning no response to the client.

* * * * *